Aug. 7, 1956  H. M. CONDON  2,757,411
APPARATUS FOR FORMING AND SORTING MEAT PATTIES
Filed Dec. 1, 1952  8 Sheets-Sheet 1

INVENTOR.
HOWARD M. CONDON
BY
William Cleland
ATTORNEY

Aug. 7, 1956  H. M. CONDON  2,757,411
APPARATUS FOR FORMING AND SORTING MEAT PATTIES
Filed Dec. 1, 1952  8 Sheets-Sheet 2

FIG. 2

INVENTOR.
HOWARD M. CONDON
BY
William Cleland
ATTORNEY

Aug. 7, 1956　　　　　　H. M. CONDON　　　　　　2,757,411
APPARATUS FOR FORMING AND SORTING MEAT PATTIES
Filed Dec. 1, 1952　　　　　　　　　　　　　　　　8 Sheets-Sheet 4

INVENTOR.
HOWARD M. CONDON
BY
William Coleland
ATTORNEY

Aug. 7, 1956  H. M. CONDON  2,757,411
APPARATUS FOR FORMING AND SORTING MEAT PATTIES
Filed Dec. 1, 1952  8 Sheets-Sheet 5

INVENTOR.
HOWARD M. CONDON
BY William Cleland
ATTORNEY

FIG. 9

INVENTOR.
HOWARD M. CONDON
BY William Cleland
ATTORNEY

Aug. 7, 1956 H. M. CONDON 2,757,411
APPARATUS FOR FORMING AND SORTING MEAT PATTIES
Filed Dec. 1, 1952 8 Sheets-Sheet 7

INVENTOR.
HOWARD M. CONDON
BY
William Cleland
ATTORNEY

Aug. 7, 1956        H. M. CONDON        2,757,411
APPARATUS FOR FORMING AND SORTING MEAT PATTIES
Filed Dec. 1, 1952        8 Sheets-Sheet 8

*INVENTOR.*
HOWARD M. CONDON
BY William Cleland
ATTORNEY

United States Patent Office 2,757,411
Patented Aug. 7, 1956

2,757,411
APPARATUS FOR FORMING AND SORTING
MEAT PATTIES

Howard M. Condon, Akron, Ohio, assignor to Grand Duchess Steaks, Inc., Akron, Ohio, a corporation of Ohio Application December 1, 1952, Serial No. 323,465

9 Claims. (Cl. 17—32)

This invention relates to apparatus for forming meat patties and preparing and sorting the same for packaging.

Heretofore, various machines on the market for making patties from comminuted raw meat have been too slow in operation for large scale production, and particularly so where the meat being pattied has been required to be maintained at low temperatures, such as within a range of from 0° F. to 25° above 0° F. Under such conditions, ordinary machines are not always dependable to form patties of desired uniform weight, and as a consequence the capacities of the machines have been reduced by reduction of the normal operating speeds of the same.

One object of the present invention is to provide a continuously operable machine, particularly useful for forming comminuted raw meat in substantially frozen or cold condition, into patties of uniform size and weight, and wherein the patty-forming pressure will not grind or cut the meat or squeeze the natural juices therefrom.

Another object of the invention is to provide a relatively simple machine for making meat or like patties continuously and at a rapid rate of speed commensurate with the speed of other operations in predeterminately timed relation thereto.

Another object of the invention is to provide a patty-forming machine including a continuously rotating disc having circumferentially spaced patty-forming openings, and an improved, continuously operable device for effectively ejecting the patties from the disc openings.

Another object of the invention is to provide an effective, highly efficient device for supplying paper or like patty separating sheets in predeterminately uniform spaced relation, as in timed sequence with operation of said patty-ejecting device.

Another object of the invention is to provide an improved device which is rapidly operable in timed sequence with operation of a said patty-forming machine for counting and sorting predetermined numbers of the formed patties in stacks thereof for subsequent packaging operations.

Other objects of the invention will be manifest from the following brief description and the accompanying drawings.

Figure 9:
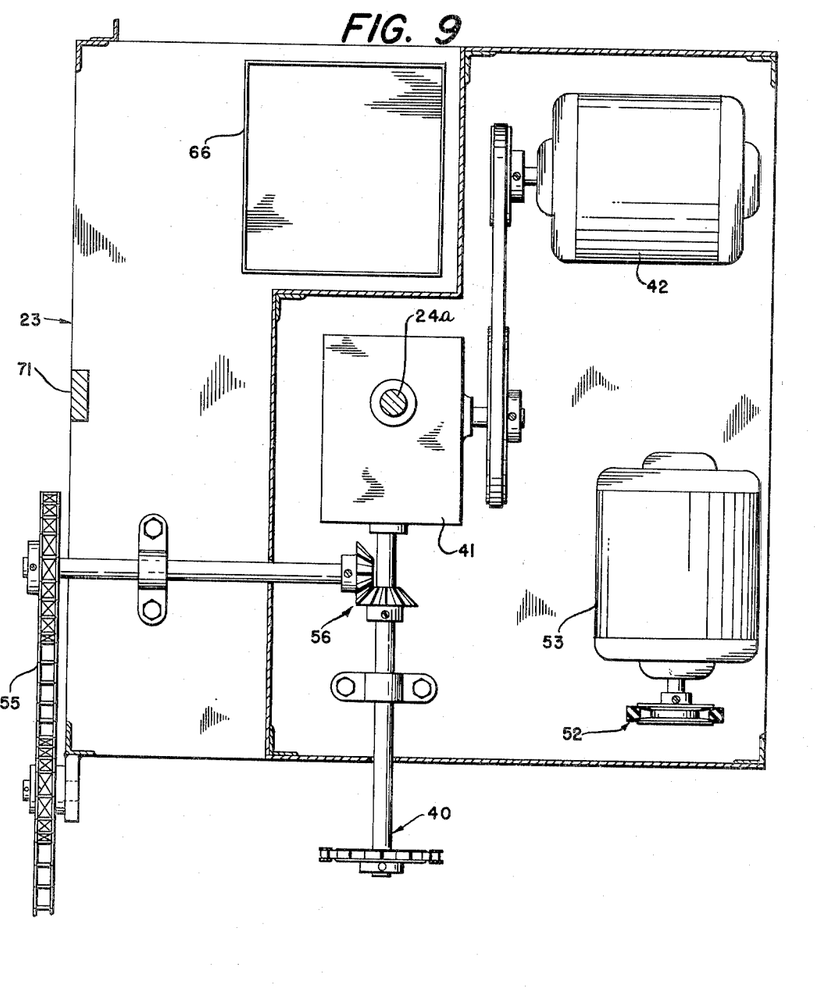
Figure 9 is a horizontal cross-section, taken substantially on the line 9—9 of Figure 2, to show the power means for the apparatus generally.

Referring particularly to Figures 1, 3, 10 and 11, there is illustrated one complete embodiment of the invention including a patty-forming unit P, a patty-ejecting unit E for ejecting patties onto a continuously operable conveyor C, paper supply units A and B at the trailing and leading ends, respectively, of the conveyor C for providing wax paper separators to be at the tops and bottoms of the respective patties, and a patty-sorting unit S at the extreme leading end of the conveyor for counting and sorting formed patties F in stacks of predetermined numbers of the same. Figure 9 shows central power means for operating the various units referred-to, directly or indirectly.

*The patty forming machine*

Referring to Figures 1 to 6, the numeral 20 designates a downwardly tapering conically shaped hopper 21, for reception of a substantial supply of comminuted meat 22, such as raw beef for pattied steaks, the hopper being fixedly mounted on a suitable framework 23, in a manner to be described (see Figure 2) to be disposed above a relatively large patty-forming disc 24 rotatably mounted within a circular recess 25 in the upper face of a horizontal backing plate 26 fixed on said framework. The disc 24 may have a segment thereof covered by a supporting platen 35 fixedly attached to said framework to have a smooth underside of the platen frictionally engageable by the disc when it is rotated. For the present purposes the disc 24 may be continuously rotated at predetermined speed by being fixed on a vertical shaft 24a from a reduction gear box 41 in power means located beneath the backing plate 26 (see Figure 9). In other words the disc 24 rotates in sliding frictional engagement between the platen 35 and the inner face 27 of recess 25 of fixed plate 26. Removably attached to the reduced lower end of the hopper 21 may be a T-shaped part 28 providing a horizontally extending hollow tube 29 removably attached at a closed end of the same to a bearing bracket 30 bolted to the platen 35 and supported at an open opposite end by a 90° elbow 31, bolted in tightly sealed relation to the platen 35. For purposes to be described in connection with the operation of the machine, the platen 35 may have a beveled edge portion 36 at the trailing side of ejector unit E with respect to rotation of disc 24.

Figure 3:
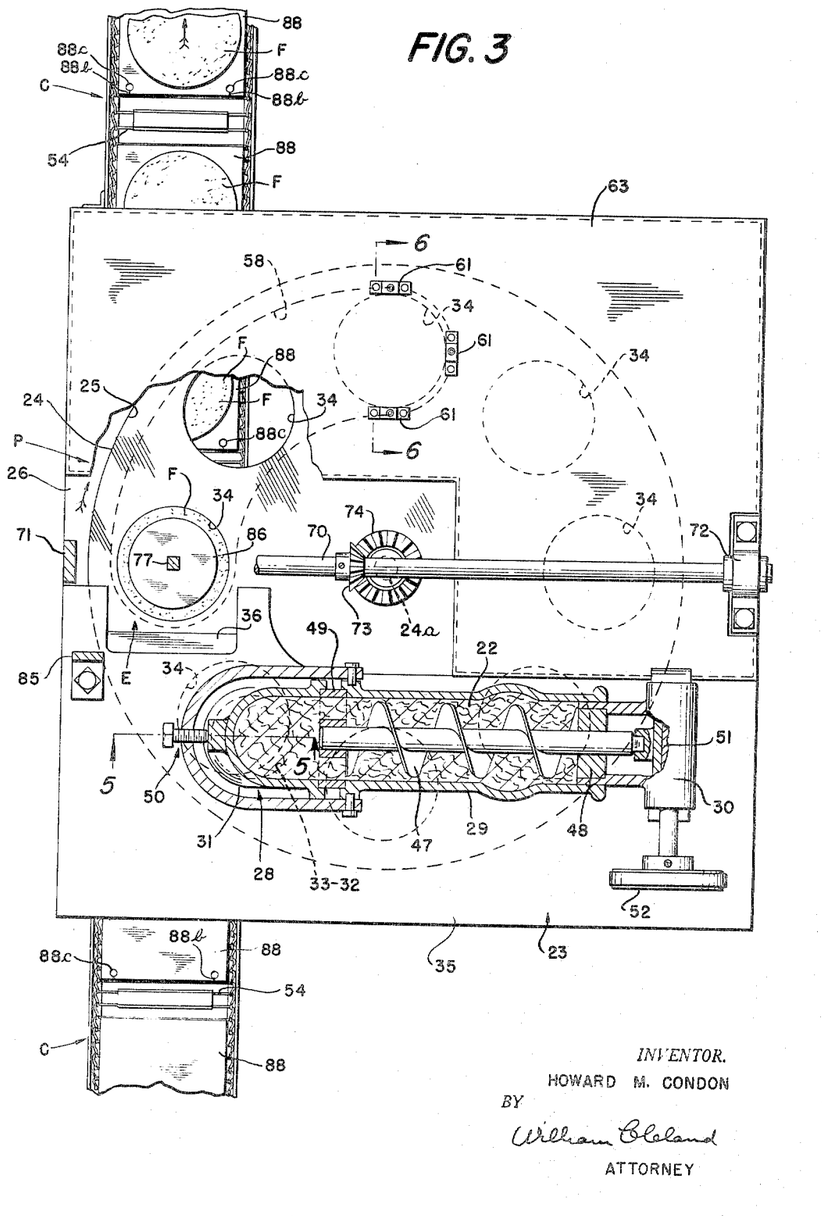
Figure 3 is a cross-section, partly broken away, taken substantially on line 3—3 of Figure 2.
Figures 4, 5, 6:
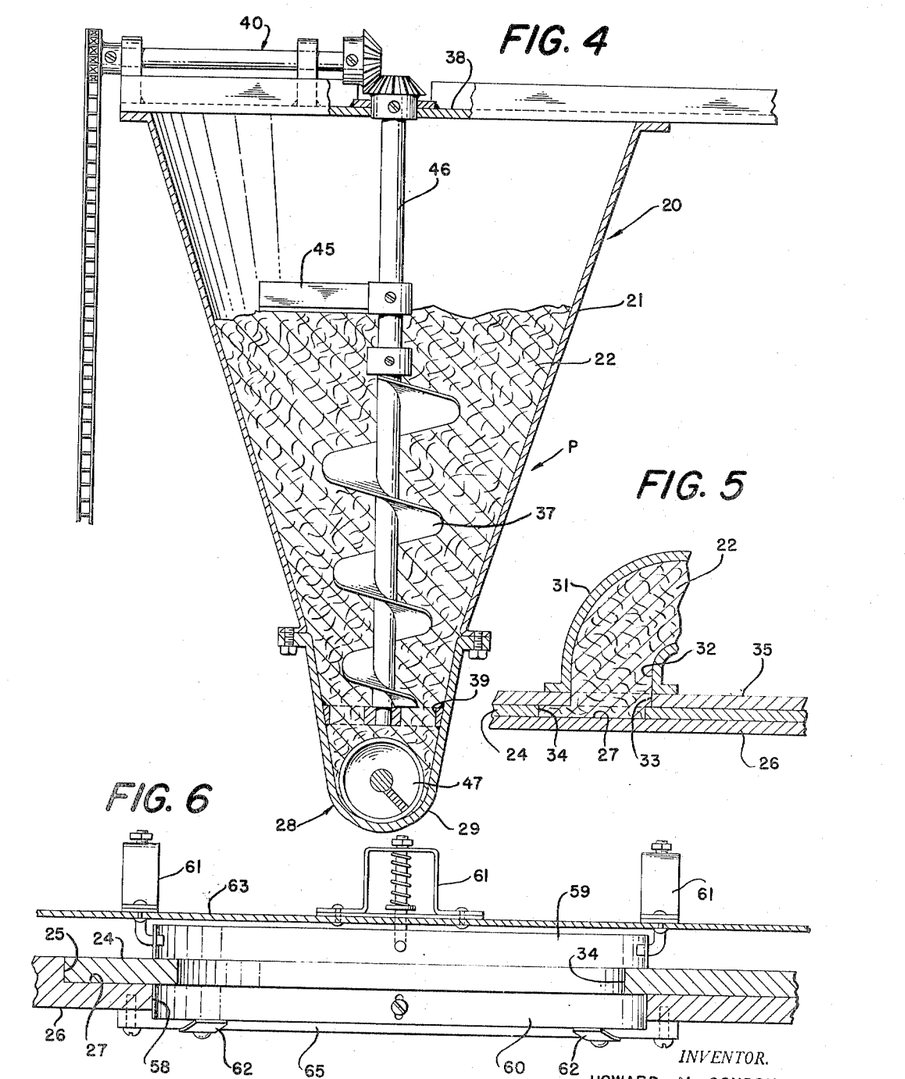
Figure 4 is a vertical cross-section taken through a meat supply hopper and feed mechanism of said pattying unit, taken substantially on the line 4—4 of Figure 2.
Figure 5 is an enlarged vertical cross-section taken substantially on the line 5—5 of Figure 3, and showing a portion of the feed mechanism of the pattying unit.
Figure 6 is an enlarged vertical cross-section, taken substantially on the line 6—6 of Figure 3, illustrating a portion of the patty-forming mechanism of the pattying unit.

As best shown in Figure 5, the elbow 31 is in the nature of an extrusion head having an extrusion orifice or mouth 32 of predetermined cross-sectional flow coinciding with a hole 33 of similar cross-sectional size and shape in the fixed platen 35 and overlying the circular path of a plurality of equally circumferentially spaced patty-forming openings 34, 34 extending through the disc 24 (see Figure 3). Eight such openings 34 are shown, although more or less may be used depending on the size of the disc 24, the size and spacing of the openings 34, and other considerations.

For forming the meat 22 into patties in the patty-forming openings 34 it is highly desirable to move the comminuted meat 22 toward extrusion orifice 32 and platen opening 33 with sufficient force to assure a product of uniform size and weight, but without grinding, cutting or squeezing the meat to destroy a certain predetermined consistency of the same or to remove the juices therefrom. Accordingly, a helical agitator or worm 37 is rotatably mounted between a narrow cross-member 38 at the top of the hopper 21 and a spider 39 within the upper portion of T-shaped part 28, the worm being continuously rotatable through a suitable drive means 40 including a gear reducer 41, driven by a motor 42, and the patty-forming disc 24 being rotated in timed relation to the worm 37 by a vertical shaft 24a from the reducer 41 (see Figures 3 and 9). The worm 37 may have the outer peripheral edge portions thereof tapered downwardly and spaced a substantial distance from the conical inner surface of hopper 21. An angularly disposed vane 45 on the shaft 46 of worm 37 is adapted to feed the meat 22 downwardly toward the worm. In addition, a worm screw 47 is journalled between a wall 48 in bearing bracket 30 and a spider 49 clamped between tube 29 and elbow 31, as by quickly releasable and adjustable clamping means indicated at 50 (see Figures 2 and 3). The worm 47 is driven at a suitable speed coordinated with the speed of disc 24 and worm 37, through gears at 51, pulley and belt connections at 52 to a motor 53 (see 2, 3, and 9). Worm 47 has its outer peripheral edges substantially spaced from the inner periphery of the tube 29 to avoid grinding, cutting or squeezing the meat. Thus, the action of the worms 37 and 47 is effective to move the meat 22 gently, but steadily and firmly toward the extrusion orifice to fill successive forming openings 34 of disc 24 solidly with meat as they pass said extrusion orifice 32.

The extrusion orifice 32 is shown located somewhat rearwardly of the most forward point on the circumferential center line of the openings 34 of disc 24. As for example, orifice 32 may be centered at the intersection of a forwardly extended 45° radius from the center of disc 24 and said circumferential center line. Thus, the disc 24 is rotated to move successive openings 34 past an extreme forward position (see Figure 3) overlying a chain belt 54 of conveyor C, which is driven at the same peripheral speed as said disc at said circumferential center line, as by a suitable chain drive 55 and gear connections 56 to gear reducer 41.

The bottom 27 of the backing plate 26, within circular recess 25 thereof, has a slot 58 therethrough of sufficient arcuate extent to include three patty-forming openings 34 in unbacked condition. That is, in the inoperative relationship shown in Figure 3 there is one opening 34 open and unbacked directly over conveyor belt 54, and two succeeding openings 34 rearwardly thereof in the direction of rotation of disc 24 are similarly open and unbacked. At the rearward end of arcuate slot 58, arcuate scraper blades 59 and 60 may be yieldingly supported against the top and bottom faces of disc 24, across the path of the openings 34 as the disc is rotated, as by suitable spring-pressed means indicated at 61, 61 and 62, 62, respectively, the means 61 being attached to a removable guard plate 63 for disc 24 and means 62 is secured to an arcuate bar 65 attached to the underside of the backing plate 26 (see Figures 3 and 6). The blades 59 and 60 are adapted to remove excess meat adhering to both sides of the revolving disc 24, said excess being dropped to a container 66 mounted beneath the backing plate (see Figure 9).

The patty-ejecting unit

The patty-ejecting unit E, shown in Figures 1, 2, 3, 7 and 8 is located above the exposed forward edge portion of disc 24 and over the center line of conveyor C. Unit E includes disc 69 keyed to a horizontal shaft 70 journalled between brackets 71 and 72 mounted at the front and rear edges, respectively, of fixed backing plate 26, the shaft 70 being driven by a bevel gear 73 fixed thereon meshing with a bevel gear 74 fixed on the aforementioned vertical shaft 24a which rotates the patty-forming disc 24.

Figure 7:
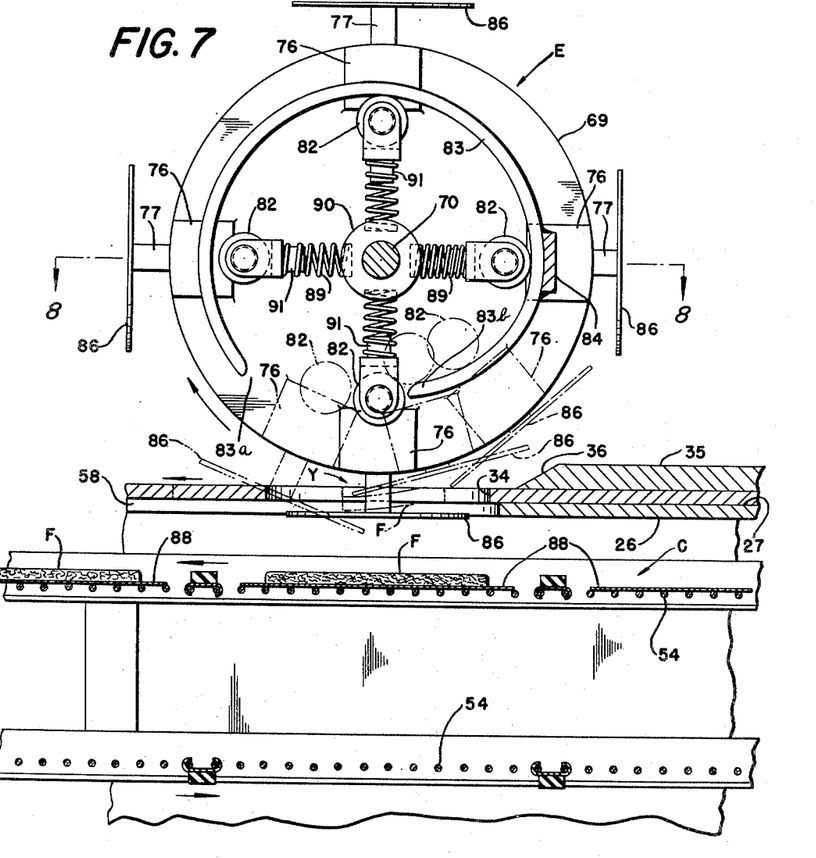
Figure 7 is a vertical cross-section, on a smaller scale than Figure 6, taken substantially on the line 7—7 of Figure 2, illustrating a patty-ejecting mechanism utilized in connection with said patty-forming mechanism.
Figure 8:
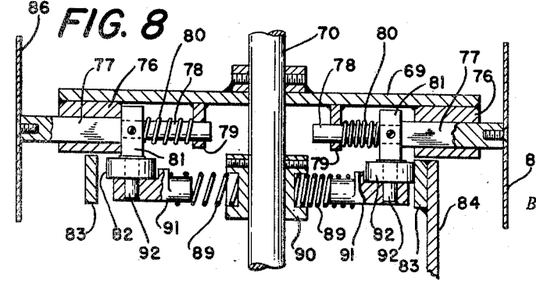
Figure 8 is a horizontal cross-section taken substantially on the line 8—8 of Figure 7.

As best shown in Figures 7 and 8 the rotary member or disc 69 has on the forward face thereof a plurality of apertured blocks 76, four being shown, through which squared shafts 77 are radially slidably but non-rotatably received. Inward extensions 78 of said shafts are radially slidably received through bosses 79 on the rotary member, and compression springs 80 between said bosses and roller arms 81 fixed on the shafts tend to urge the shafts radially outwardly toward stop positions in which the roller arms are engaged with inner portions of the blocks 76.

Mounted on each roller arm 81 may be a small roller 82 which is engageable with a cam track 83 fixedly supported on a rearward extension 84 of a bracket 85, bolted to the fixed top platen 35. On freely outwardly presented ends of each shaft 27 may be a circular plate or foot 86 slightly smaller than the openings 34 in the patty-forming disc 24. The cam track 83 is open at the bottom, as indicated at 83a, and so shaped or curved whereby upon rotation of member 69 in clockwise direction (Figure 7) the roller 82 of each shaft 77 engages the inner face of the track to urge its shaft radially inwardly against the yielding action of said spring 80, until the roller approaches a downwardly extending free end portion 83b of the track closely adjacent a vertical centerline of rotary member 69, in which the foot 86 is in fully inwardly retracted position as shown in the second chain-dotted line position from the right of Figure 7. In this position the leading edge of a foot 86 is shown penetrating into a patty opening 34, at a leading edge thereof, as indicated at "Y" in Figure 7, and a patty F is commencing to be pushed from its forming opening 34 (see chain-dotted lines). At the instant the same foot 86 is substantially centered with respect to the corresponding opening 34 its roller 82 suddenly disengages the end portion 83b of the cam track, thereby allowing the spring 80 to urge the shaft 77 radially outwardly with rapid or substantially instantaneous movement in which the foot 86 on the shaft flatly engages the patty in said corresponding opening 34 and quickly urges it downwardly onto a square sheet or separator 88 of waxed paper on the conveyor belt 54. A series of such sheets 54 is previously laid on the belt in predeterminately spaced relation by the paper supply unit A at the right hand or trailing end of the conveyor (Figure 1), in a manner to be described later. As the pattying disc 24 continues to revolve the rotary member 69 rotates in timed relation thereto to withdraw said corresponding foot 86 upwardly through opening 34 without touching the disc 24, as indicated in chain-dotted lines at the extreme left of Figure 7, and the described cycle of operation is repeated. The four feet 86 operate in this manner continuously, progressively to engage patties F in successive openings 34 in the revolving disc 24.

In order that pressure of the rollers 82 on cam track 83 will not apply undesirable torque action tending to bind the shafts 77 against free sliding action in the blocks 76, additional compression springs 89 may be provided between a hub 90 fixed on central shaft 70 and arms 91 carried by extensions 92 of the arms 81. These springs 89 also serve to provide additional power to snap the radial arms 77 outwardly to the patty-ejected positions of the feet 86, shown in full lines in Figure 7.

Separator supplying units

Referring now to Figures 1, 10, 11 and 12, the separator supplying unit A, at the trailing end of conveyor C, ejects wax paper sheets onto the conveyor belt 54 in predeterminately spaced relation in timed sequence to receive patties F in centered positions thereon, as the sheets pass ejector device E in the relationship best shown in full lines in Figure 7. Separator supplying unit B at the opposite end of the conveyor applies similar wax sheets 88a on top of each patty F. As the units A and B are substantially alike only the unit B will be described in detail, and like parts in both units will be given like numerals unless otherwise noted.

In unit B (Figures 10 to 12), a pair of transversely spaced pins 100 extend freely upwardly from a crosspiece 102 supported on brackets 103 secured to each side of conveyor frame 104. The pins 100 are rearwardly arched to be received through aligned apertures in sheets 88a in a stack 110 thereof, to arch downwardly by gravity with the lower edges of the sheets 88a engaging a similarly arched backing sheet 105 of thin springy metal fixed at its lower edge portion 106 to the sides 104 of the conveyor and at its upper edge portion 107 to upstanding rods 108 supported on clips 109 on said frame sides 104. The spacing between backing sheet 105 and rods 100 converges downwardly so that the lowermost sheets 88a in the stack 110 flex forwardly to a feathered edge constituting a single thickness of paper backed by said forward edge portion of backing sheet 105. A fixed cross-bar 112 engages the bottom of the stack to fix the position of the forward edge of the bottom sheet 88a directly in the path of a half cylindrical rubber pad 113 on a roller 114 journalled between the brackets 103. Roller 114 is continuously rotated, as by a chain drive mechanism 115 from the leading end of the driven conveyor belt, the arrangement being such that with each revolution of roller 114 the pad 113 engages the lower edge of a bottom sheet 88a and pulls it loose from pins 100 to be deposited on top of a patty F on the correspondingly moving conveyor belt. Slits or notches 88b to the paper apertures 88c facilitate said removal of the papers from pins 100, and a weighted plate 116, having apertures for reception of the pins 100, is adapted to assist downward gravitational feeding of the stack, which is easily replenished by upward removal of said weighted plate.

Figures 10, 11, 12:
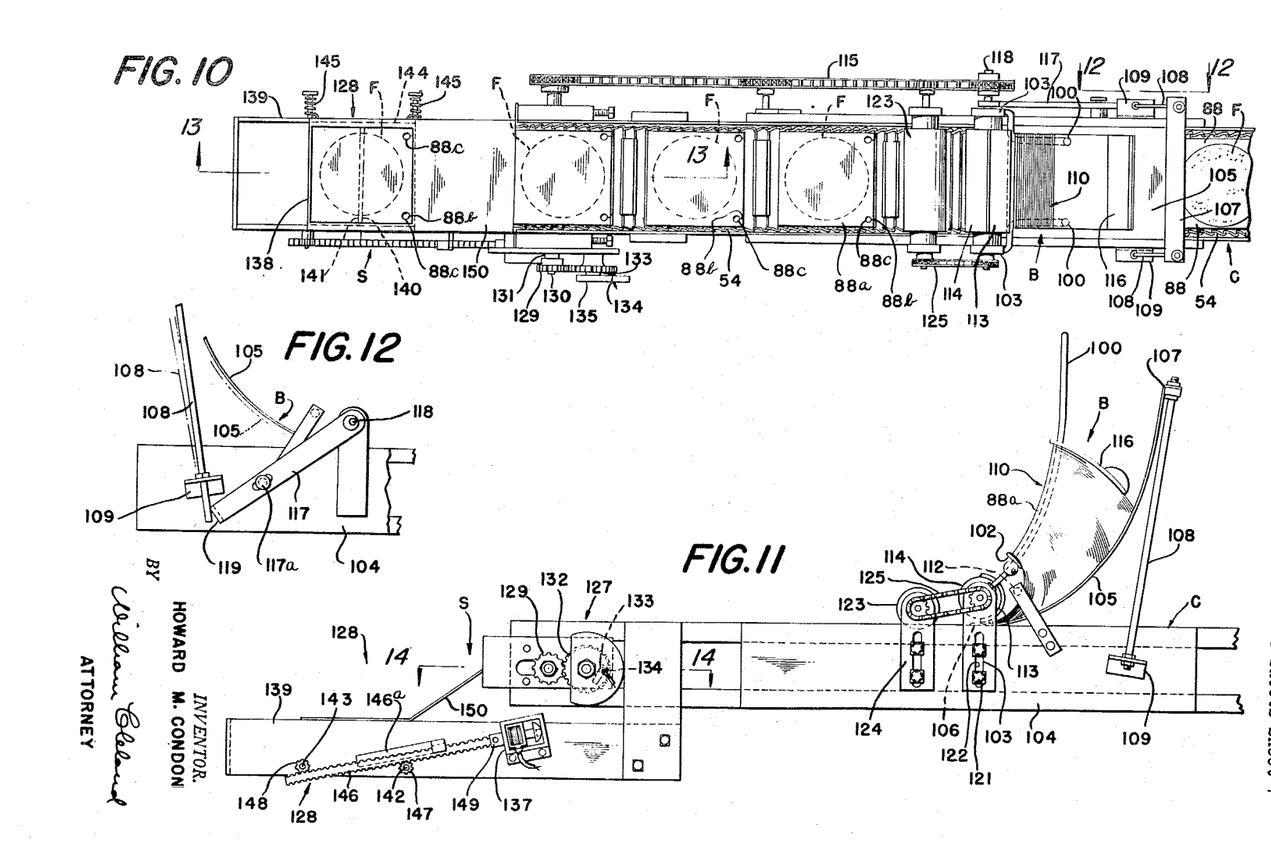
Figure 10 is a top plan view, on a reduced scale, of a leading end portion of a conveyor which is mounted at the front of the patty-forming unit, and particularly illustrating an improved paper insert take-off device and a patty-sorting device.
Figure 11 is a front elevation of the portion of the apparatus shown in Figure 10.
Figure 12 is a fragmentary rear view, taken substantially at 12—12 of Figure 10, showing vibratory means for said insert take-off device.

In order to obviate adhesion of the lower edges of sheets 88a to the flexible backing sheet 105, means may be provided for vibrating or flexing the backing sheet 105 to a slight degree. For this purpose, an arm 117 slidably pivoted at 117a intermediate its ends to conveyor frame 104, has one said end eccentrically connected at one end to a shaft extension 118 of roller 114, the other end 119 of the arm engaging a suitable portion of one of the upright rods 108. As the roller 114 rotates the resultant intermittent pressure of the end 119 of arm 117 on rod 108, in the manner shown in Figure 12, is effective to flex the rod and thereby to flex the backing sheet 105 sufficiently to keep the sheets 88a fed downwardly toward roller 114. The vertical positioning of roller 114 is adjustable by vertical adjustment of the brackets 103 through spaced clamping bolts or screws 121 received through slots 122 in the brakets.

A rubber covered roller 123 on a similarly adjustable bracket 124, and driven by a chain drive 125 to roller 114, is arranged to press the thus dispensed wax papers 88a onto the patties F.

The sheet dispensing unit A does not require the pressing roller 123. The take-off roller 113 of this unit (see Figure 1) is driven at corresponding speed, as by a chain drive 126 from the trailing end of conveyor belt 54. A vibratory or flexing device as best shown in Figure 12 may be used.

The patty-sorting unit

The patty-sorting unit S, best shown in Figures 1, 10, 11 and 13, counts the patties F and sorts them in stacks of required numbers thereof, as for furnishing in packages containing three, four or five steaks or patties of a given total weight. This unit includes electrical means 127 for manifesting passage of a predetermined number of patties along the conveyor, and stacking mechanism 128 controlled thereby.

Manifesting means 127 includes a pinion 129, on an outward extension 130 of a continuously driven conveyor chain shaft 131 at the leading end of the conveyor C, said pinion meshing with a relatively large idler gear 132, on the forward face of which is a yielding contact 133 engageable with a fixed contact 134 on a plate 135 of insulating material non-rotatably secured to the forward end of a shaft 136 on which gear 132 is rotatable. The gear ratio, for example, may be such that one revolution of gear 132 indicates forward movement of a length of conveyor chain 54 carrying four patties F. Thus, each passage of four patties F manifested by momentary closing of the contacts 133 and 134 in an electrical circuit (not shown) momentarily operates a solenoid 137 for purposes to be described.

Stacking mechanism 128 comprises a square-walled, open-topped container 138, supported on a downwardly stepped extension 139 of conveyor frame 104. The bottom of this container constitutes a pair of door panels 140 and 141 fixed on hinge pins 142 and 143, respectively, rotatably supported between opposite sides of frame extension 139. These panels are normally yieldingly maintained in the closed patty-supporting position, shown in Figures 10 and 13, against shock-proof stop pads 144, as by means of suitable wind-up springs 145 mounted on rearward extensions of the hinge pins 142 and 143.

Figure 13:
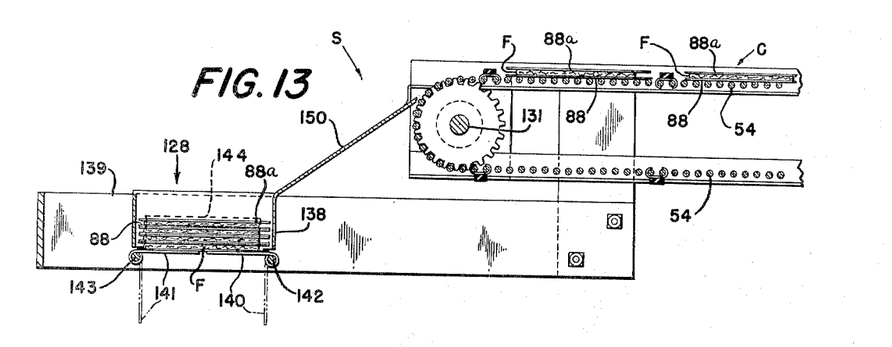
Figure 13 is an enlarged vertical cross-section through the patty-sorting device, taken substantially on the line 13—13 of Figure 10.
Figure 14:
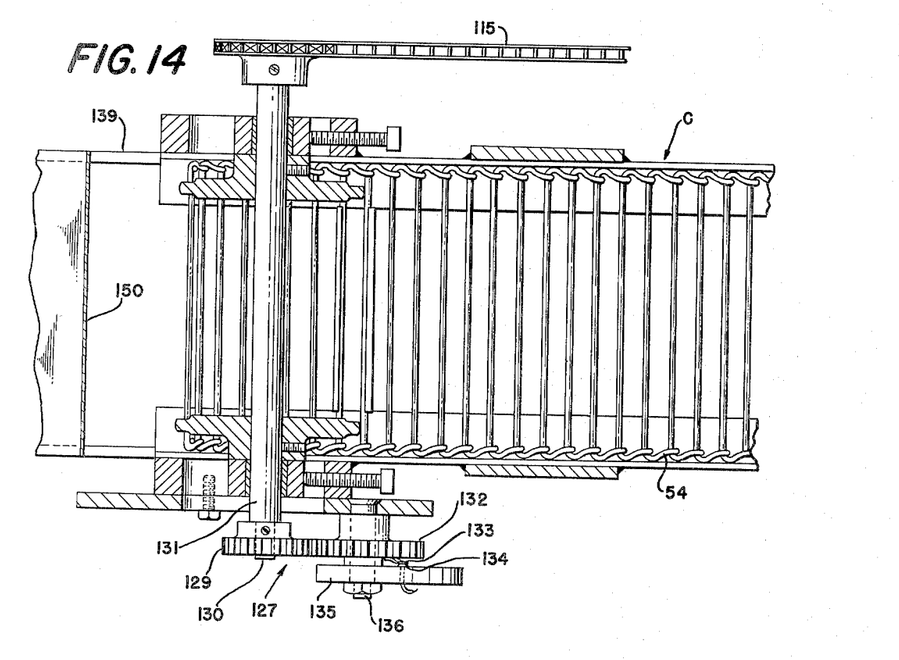
Figure 14 is an enlarged horizontal cross-section through a related portion of the conveyor, taken substantially on the line 14—14 of Figure 11.

The door panels are quickly momentarily swingable from and toward open positions thereof shown in chain-dotted lines in Figure 13, by means of a double rack bar 146 having opposite toothed edges engaging relatively small pinions 147 and 148 fixed on forward extensions of the hinge pins 142 and 143, as shown, for rotating the same in oppositely inward directions. One end of the rack is connected to the movable core 149 of solenoid 137 to be movable thereby. A guide 146a on the frame holds the rack bar in contact with said pinions.

With this arrangement, each time four patties F have passed in sequence from the end of conveyor C, and down an inclined ramp or guide means 150 onto the closed door panels 140 and 141, the contacts 133 and 134 will have been closed for a brief moment to actuate solenoid 137. The resultant movement of the rack 146 is effective on the pinions 147 and 148 to open the door panels quickly, against strong resiliency of the springs 145, thereby dropping four stacked patties F by gravity into a carton 151 placed on an auxiliary conveyor 152 (see Figure 1). When the electrical contact between contacts 133 and 134 is broken the springs 145 quickly return the door panels 140 and 141 to closed position. The number of patties dropped in the stacks may be changed by replacing the removably mounted gears 129 and 132 with gears of requisite ratios.

Operation of the machine

In the operation of the machine for making and sorting meat patties F into stacks, the motors 42 and 53 of the power unit shown in Figure 9 are running continuously. Motor 42 operates to revolve the patty-forming disc 24 at a high rate of speed in clockwise direction as viewed in Figure 3, and to drive conveyor belt 54 of conveyor C in corresponding direction. Motor 42 also continuously drives the tapered worm 37 in the supply hopper 21 (see Figure 4) to feed comminuted meat 22 therein, such as raw beef in freezing but wet pliable condition, steadily toward a worm 47 in the horizontal tube 29 communicating with the bottom of the hopper, the worm 47 being driven by a motor 53 of the power unit. The power transmission means 52 from the motor 53 to the worm 47 may include adjustable pulley and belt means to regulate the rotative speed of the worm 47.

The worms 37 and 47 gently but firmly move the meat 22 in a uniform stream through the orifice 32 of extrusion head 29 and corresponding opening 33 in the fixed platen 35, to compact the meat against the upper face of revolving disc 24, in the path of the patty-forming openings 34 thereof. Thus, each successive opening 34 passing under the extrusion head 31 receives a charge of meat 22 which fills the same solidly against the backing surface 27 of fixed plate 26 (see Figure 5), and the corresponding meat filling comprising a patty F is further compacted to flattened shape by shearing action thereon and by frictional engagement of the rotating disc 24 between platen 35 and said backing surface 27 in the plate 26. This action takes place in a relatively small area between extrusion head 31 and a bevelled edge 36 of fixed platen 35 adjacent the trailing end of the elongated opening 58 in the bottom of said plate 26 (Figures 5 and 7). As the rotating disc 24 moves successive meat-filled openings 34 into the unbacked area directly over the conveyor C, the patty-ejecting unit E, best shown in Figures 3, 7 and 8, is operable as described above, to snap successive ejector feet 86 through respectively vertically aligned openings, thereby quickly pushing the patties F from their disc openings 34, onto wax paper separators 88 previously distributed on conveyor chain 54 by the separator supplying unit A (Figure 1).

Figure 1:
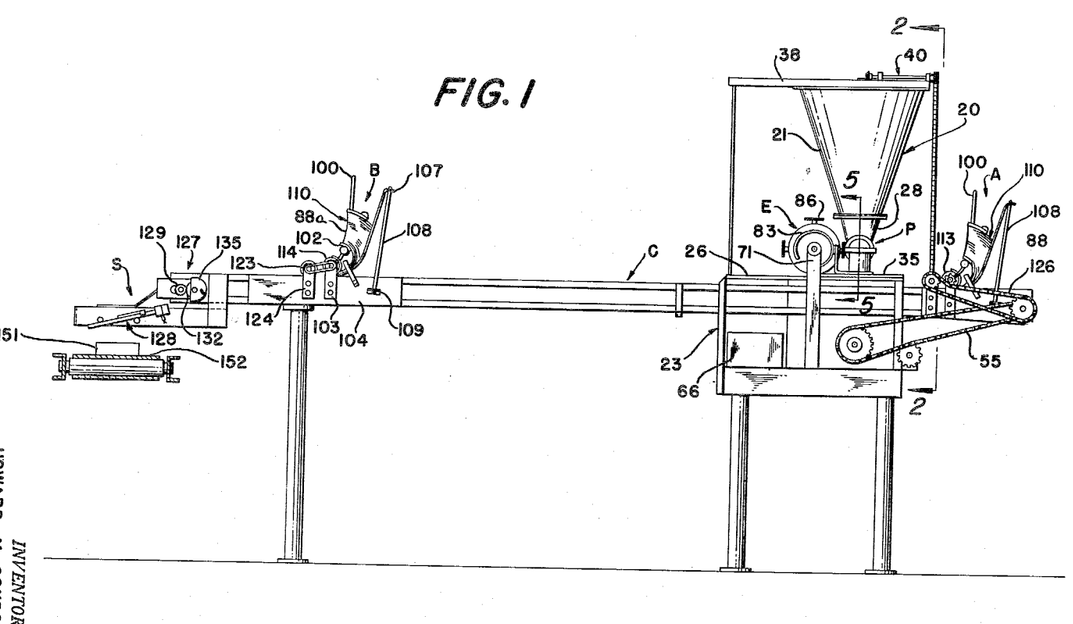
Figure 1 is a front elevation of a meat pattying and sorting machine embodying the features of the invention.
Figure 2:
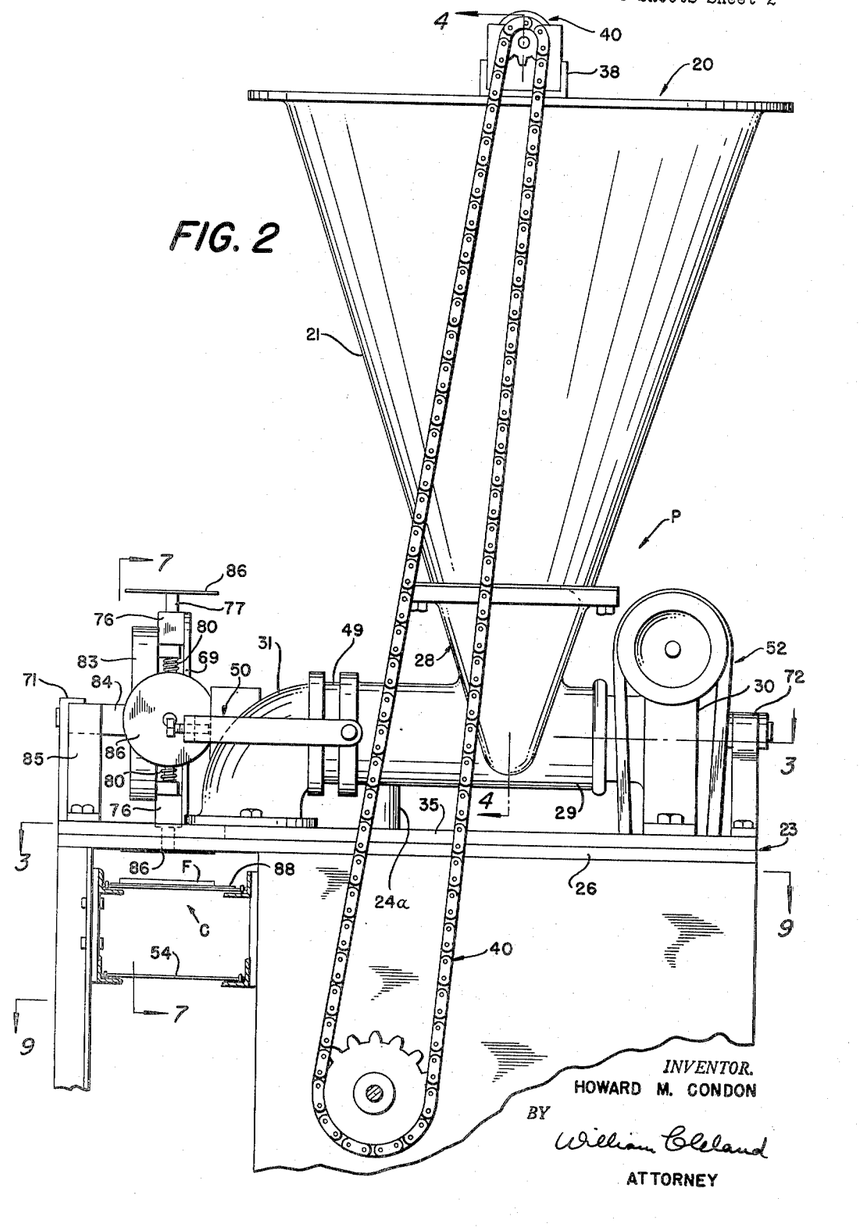
Figure 2 is an enlarged end view, partly broken away, of a meat pattying unit of the machine, as viewed substantially on the line 2—2 of Figure 1.

Patties F supplied to conveyor chain 54 in this manner in predeterminately spaced relation have similar wax paper separators 88a pressed on top of the same by the separator supply unit B (Figure 1).

Upon reaching the end of conveyor C the patties F slide down the ramp 150 by gravity and come to rest in stacks of predetermined numbers thereof on the normally closed door panels 140 and 141 of the stacking mechanism 128 (see Figures 1, 10, 11, 13 and 14). Presence of said predetermined number of patties in container 138, four being shown, is manifested by momentarily closing the electrical contacts 133 and 134 of mechanism 127, thereby momentarily operating solenoid 137 to open the door panels 140 and 141 and drop the stack into a carton 151 on auxiliary conveyor 152.

*Conclusion*

Thus, has been provided a machine which is continuously operable to make patties of beef-steak or similar materials at a very high rate of speed and to supply the patties in stacks of predetermined numbers thereof and with wax paper separators properly applied to prevent adhesion of the patties to each other or to the containers 151. Because of the continuous and efficient operation of the machine it is capable of producing and sorting upwards of 6,720 patties F, of uniform size and weight, per hour. This is almost four times the capacity of any other patty-forming machine presently available on the market. The capacity may be increased, for example, by increasing the size of the patty-forming disc 24 and associated parts. In any event, the weight of the patties F is variable by interchanging discs 24 having different sized openings 34 therein.

Modifications of the invention may be resorted to without departing from the spirit thereof or the scope of the appended claims.

What is claimed is:

1. Apparatus for forming patties of meat or like material, comprising a relatively fixed member having a backing surface portion, a continuously rotatable forming plate mounted against said backing surface portion and having a plurality of circumferentially spaced patty-forming openings therethrough adapted to be closed at one side of the forming plate by said backing surface portion, means for continuously rotating said forming plate in a given direction relatively of said member, a relatively fixed extrusion device having an outlet end at the other side of said forming plate and presenting an extrusion orifice thereto opposite said backing surface portion and in the path of said patty-forming openings as the forming plate is continuously rotated, feeding means in said extrusion device for continuously feeding said material through said extrusion orifice progressively to fill said patty-forming openings against said backing surface portion, a portion of said forming plate at a position forwardly of said extrusion device being unbacked by said backing surface portion in the path of said patty-forming openings and adapted progressively to expose the filled said openings at both said sides of the forming plate, and ejector means operable in synchronism with continuous rotation of said forming plate and including at least one element momentarily engageable with formed material of each so exposed patty-forming opening at said position to eject the formed material from the openings.

2. Apparatus for forming patties of meat or like material, comprising a relatively fixed member having a backing surface portion, a continuously rotatable forming plate mounted against said backing surface portion and having a plurality of circumferentially spaced patty-forming openings therethrough adapted to be closed at one side of the forming plate by said backing surface portion, means for continuously rotating said forming plate in a given direction relatively of said member, a relatively fixed extrusion device having an outlet end at the other side of said forming plate and presenting an extrusion orifice opposite said backing surface portion and in the path of said patty-forming openings as the forming plate is continuously rotated, feeding means in said extrusion device adjacent said orifice for continuously feeding said material through said extrusion orifice progressively to fill said patty-forming openings against the backing surface portion, a portion of said forming plate at a position forwardly of said extrusion device being unbacked by said backing surface portion in the path of said patty-forming openings and adapted progressively to expose the filled said openings at both said sides of the forming plate, and ejector means operable in synchronism with continuous rotation of said forming plate and including at least one element momentarily engageable with formed material of each so exposed patty-forming opening at said position to eject the formed material from the openings, said extrusion device having a hopper connected thereto for a supply of said material and continuously driven impeller means being provided within said hopper for continuously moving material therein toward said feeding means.

3. Apparatus for forming patties of meat or like material, comprising a relatively fixed member having a backing surface portion, a continuously rotatable forming plate mounted against said backing surface portion and having a plurality of circumferentially spaced patty-forming openings therethrough adapted to be closed at one side of the forming plate by said backing surface portion, means for continuously rotating said forming plate in a given direction relatively of said member, a relatively fixed extrusion device having an outlet end at the other side of said forming plate and presenting an extrusion orifice thereto opposite said backing surface portion and in the path of said patty-forming openings as the plate is continuously rotated, a hopper connected to said extrusion device for supplying said material thereto, feeding means in said extrusion device including a driven worm screw means for continuously feeding material received from said hopper through said extrusion orifice progressively to fill said patty-forming openings against said backing surface portion, impeller means in said hopper including moving portions for feeding said material from said hopper to said screw means, a portion of said forming plate at a position forwardly of said extrusion device being unbacked by said backing surface portion in the path of said patty-forming openings and adapted progressively to expose the filled said openings at both said sides of the forming plate, and ejector means operable in synchronism with continuous rotation of said forming plate and including a medium which is momentarily engageable with formed material of each so exposed patty-forming opening at said position to eject the formed material from the openings.

4. Apparatus for forming patties of meat or like material, comprising a relatively fixed member having a backing surface portion, a continuously rotatable forming plate mounted against said backing surface portion and having a plurality of circumferentially spaced patty-forming openings therethrough adapted to be closed at one side of the forming plate by said backing surface portion, means for continuously rotating said forming plate in a given direction relatively of said member, a relatively fixed extrusion device having an outlet end at the other side of said forming plate and presenting an extrusion orifice thereto opposite said backing surface portion and in the path of said patty-forming openings as the forming plate is continuously rotated, feeding means in said extrusion device for continuously feeding said material through said orifice progressively to fill said openings against the backing surface portion, a portion of said forming plate at a position forwardly of said extrusion device being unbacked by said backing surface portion in the path of said patty-forming openings and adapted progressively to expose the filled said openings at both said sides of the forming plate, and ejector means at said one side of said forming plate including plunger means operable in synchronism with continuous rotation of the forming plate for meshingly engaging within successive said patty-forming openings and thereby to eject the formed material from the respective openings in succession.

5. Apparatus for forming patties of meat or like material, comprising a support, a forming plate rotatably mounted on said support and having therethrough a plurality of circumferentially spaced patty-forming openings, said forming plate having a portion thereof with at least one said opening at a given point with respect to said support free and unobstructed at both sides of the forming plate, means operatively associated with said forming plate for continuously rotating said forming plate about an axis thereof, means mounted adjacent said forming plate for progressively forming patties of said material in said patty-forming openings as the plate is continuously rotated, a member mounted at said given point to be rotatable about an axis outwardly of the plane of the plate and at an angle to said axis thereof, a plurality of peripherally spaced, radially extending elements on said member and having free outer end portions, and means associated with said member for rotating said member in synchronism with rotation of said plate progressively to receive successive said free outer end portions within successive said patty-forming openings to eject formed patties therefrom.

6. Apparatus for forming patties of meat or like material, comprising a support, a continuously rotatable forming plate mounted on said support and having therethrough a plurality of circumferentially spaced patty-forming openings, means operatively associated with said forming plate for continuously rotating said forming plate about an axis thereof, said forming plate having a portion thereof with at least one said patty-forming opening at a given point with respect to said support free and unobstructed at both sides of the plate, means mounted adjacent said forming plate for progressively forming patties of said material in said patty-forming openings as the plate is continuously rotated, an ejector member mounted at said given point to be rotatable about an axis outwardly of the plane of the plate and at an angle to said axis thereof, a plurality of peripherally spaced, radially extending elements on said ejector member and having free outer end portions, and means operatively associated with said ejector member for rotating said ejector member in synchronism with rotation of said forming plate progressively to receive successive said free outer end portions within successive said patty-forming openings to eject formed patties therefrom, said elements being mounted to be radially shiftable on said ejector member toward and from said plane of the plate, and cam means operable upon rotation of said ejector member to move said elements radially toward and from said reception of the free outer end portions of the elements within the patty-forming openings.

7. Apparatus for forming patties of meat or like material, comprising a support, a continuously rotatable forming plate mounted on said support and having therethrough a plurality of circumferentially spaced patty-forming openings, means operatively associated with said forming plate for continuously rotating said forming plate about an axis thereof, said forming plate having a portion thereof with at least one said patty-forming opening at a given point with respect to said support free and unobstructed at both sides of the plate, means mounted adjacent said forming plate for progressively forming patties of said material in said patty-forming openings as the plate is continuously rotated, an ejector member mounted at said given point to be rotatable about an axis outwardly of the plane of the plate and at an angle to said axis thereof, a plurality of peripherally spaced, radially extending elements on said ejector member and having free outer end portions, and means associated with said ejector member for rotating said ejector member in synchronism with continuous rotation of said forming plate progressively to receive successive said free outer end portions within successive said patty-forming openings to eject formed patties therefrom, said elements being mounted to be radially shiftable on said ejector member, cam means operable upon rotation of said ejector member to move said elements toward and from said reception of the free outer end portions of the elements within the patty-forming openings, and spring means tending to urge said elements radially outwardly of the ejector member, said cam means including a relatively fixed track having an arcuate inner track surface, rollers mounted on said radially shiftable elements, said rollers being engageable with said arcuate track surface against the yielding action of said spring means, said track surface having an open portion permitting disengagement of said rollers with the track surface for a predetermined period in which said spring means urges successive said elements radially outwardly for said ejection of the formed patties.

8. Apparatus as set forth in claim 1, wherein scrapers are mounted in unbacked portions of said forming plate in advance of said ejector means to engage edges of the scrapers with opposite sides of the forming plate transversely of the path of said patty-forming openings thereof, for removing excess material from the forming plate.

9. Apparatus as set forth in claim 1, wherein scrapers are mounted in unbacked portions of said forming plate in advance of said ejector means to engage edges of the scrapers with opposite sides of the forming plate transversely of the path of said patty-forming openings thereof, for removing excess material from the forming plate, wherein said scrapers are spring-pressed toward said forming plate.

References Cited in the file of this patent

UNITED STATES PATENTS

| | | |
|---|---|---|
| 470,692 | Merrell | Mar. 15, 1892 |
| 1,310,262 | Van Berkel | July 15, 1919 |
| 1,594,883 | Holmberg et al. | Aug. 3, 1926 |
| 1,637,833 | Mueller | Aug. 2, 1927 |
| 2,185,174 | Hendler | Jan. 2, 1940 |
| 2,366,379 | Bemis | Jan. 2, 1945 |
| 2,413,046 | Holly | Dec. 24, 1946 |
| 2,475,463 | Santo | July 5, 1949 |
| 2,553,823 | Holly | May 22, 1951 |